(12) United States Patent
Eldar (10) Patent No.: US 7,779,451 B2
(45) Date of Patent: Aug. 17, 2010

(54) SECURING WAKEUP NETWORK EVENTS

(75) Inventor: Avigdor Eldar, Jerusalem (IL)

(73) Assignee: Intel Corporation, Santa Clara, CA (US)

( * ) Notice: Subject to any disclaimer, the term of this patent is extended or adjusted under 35 U.S.C. 154(b) by 983 days.

(21) Appl. No.: 11/395,471

(22) Filed: Mar. 30, 2006

(65) Prior Publication Data

US 2007/0234401 A1 Oct. 4, 2007

(51) Int. Cl.
*G06F 7/04* (2006.01)
(52) U.S. Cl. ..................................... 726/2; 726/5; 726/6
(58) Field of Classification Search ..................... 726/2, 726/5, 6
See application file for complete search history.

(56) References Cited

OTHER PUBLICATIONS

AMD (Magic Packet Technology, AMD, year 1998).*
SRP (RFC 2945 of Network Working Group for SRP 3.0 standard, year 2000).*
A Key Management and Authentication Model for Ad hoc Network; Jianwei Liu; Chun Liu; Keqiang Guo; Personal, Indoor and Mobile Radio Communications, 2007. PIMRC 2007. IEEE 18th International Symposium on Publication Year: 2007 , pp. 1-5.*
Improvement on WLAN Multicast Key Management Protocol; Huixian Li; Liaojun Pang; Computational Intelligence and Security, 2008. CIS '08. International Conference on vol. 2 Publication Year: 2008 , pp. 419-424.*
Distributed key selection for group applications in ad hoc networks; Obut, E.; Ozkasap, O.; Computer and Information Sciences, 2008. ISCIS '08. 23rd International Symposium on Publication Year: 2008 , pp. 1-6.*
NDIS Wake-on-LAN Support (Windows CE.NET Driver Development), Web Page, Retrieved on the interenet at: http://www.microsoft.com/library/en-us/wceddk40/html/cxorindiswake-on-lansupport.asp?. Retrieved on Mar. 30, 2006, 1 page.
Intel® Desktop Adapters—Wake on Lan* and System Compatibility. Network Connectivity, Web Page. Retrieved on the interenet at: http://support.intel.com/support/network/adapter/pro100/sb/cs-008438.htm. Retrieved on Mar. 30, 2006, pp. 1-4.
Define Wake on Lan—a Whatis.com definition, Wake on LAN, Web Page. Retrieved on the internet at: http://searchnetworking.techtarget.com/sDefinition/0,,sid7_gci214609,00.html Retrieved on Mar. 30, 2006, pp. 1-3.

* cited by examiner

*Primary Examiner*—David Y Jung
(74) *Attorney, Agent, or Firm*—Christopher K. Gagne (57) ABSTRACT

In an embodiment, a method is provided. The method of this embodiment provides receiving a packet having a wake-up pattern, and waking up if the wake-up pattern corresponds to one of a number of dynamically modifiable passwords on a pattern wake list, each of the dynamically modifiable passwords being based, at least in part, on a seed value.

26 Claims, 5 Drawing Sheets

SECURING WAKEUP NETWORK EVENTS

FIELD

Embodiments of this invention relate to securing wakeup network events.

BACKGROUND

Wake-on LAN (local area network) or wake-on wireless LAN systems ("WOL") is a technology that allows a sleeping computer to be awakened over a network. In a WOL system, a wake-enabled network controller may have a constant power source to boot up to receive packets, and to decode packets to determine if they are wake-up packets. Furthermore, wake-up packets may be identified by a wake-up pattern, where the wake-up pattern may comprise a pre-defined pattern of bytes, followed by sixteen repeats of the system's MAC (media access control) address, for example. Optionally, this may be followed by a password. The password may be user-determined, and may be programmed into a network controller. For example, the password may be 4, 6, or 16 bytes, for example, and the network controller may be further programmed to accept combinations of the password.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Examples described below are for illustrative purposes only, and are in no way intended to limit embodiments of the invention. Thus, where examples may be described in detail, or where a list of examples may be provided, it should be understood that the examples are not to be construed as exhaustive, and do not limit embodiments of the invention to the examples described and/or illustrated.

Figure 1:
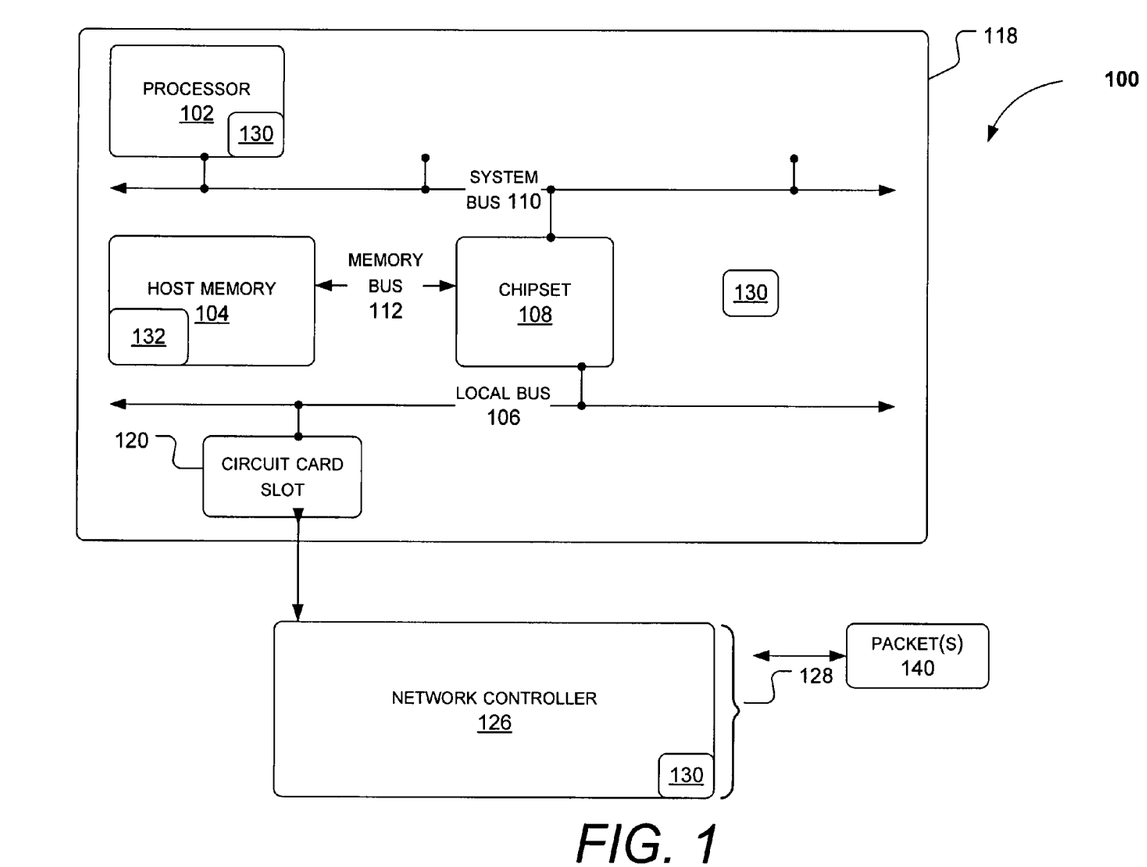
FIG. 1 illustrates a system according to an embodiment.

Methods described herein may be implemented in a system, such as system 100 illustrated in FIG. 1. System 100 may comprise one or more processors 102 (only one shown). A "processor" as discussed herein relates to a combination of hardware and software resources for accomplishing computational tasks. For example, a processor may comprise a system memory and processing circuitry (e.g., a central processing unit (CPU) or microcontroller) to execute machine-readable instructions for processing data according to a predefined instruction set. Alternatively, a processor may comprise just the processing circuitry (e.g., CPU). Another example of a processor is a computational engine that may be comprised in a multi-core processor, for example, where the operating system may perceive the computational engine as a discrete processor with a full set of execution resources. However, these are merely examples of processor and embodiments of the present invention are not limited in this respect.

System 100 may additionally comprise memory 104. Memory 104 may store machine-executable instructions 132 that are capable of being executed, and/or data capable of being accessed, operated upon, and/or manipulated. "Machine-executable" instructions as referred to herein relate to expressions which may be understood by one or more machines for performing one or more logical operations. For example, machine-executable instructions may comprise instructions which are interpretable by a processor compiler for executing one or more operations on one or more data objects. However, this is merely an example of machine-executable instructions and embodiments of the present invention are not limited in this respect. Memory 104 may, for example, comprise read only, mass storage, random access computer-accessible memory, and/or one or more other types of machine-accessible memories.

Chipset 108 may comprise one or more integrated circuit chips, such as those selected from integrated circuit chipsets commercially available from Intel® Corporation (e.g., graphics, memory, and I/O controller hub chipsets), although other one or more integrated circuit chips may also, or alternatively, be used. According to an embodiment, chipset 108 may comprise an input/output control hub (ICH), and a memory control hub (MCH), although embodiments of the invention are not limited by this. Chipset 108 may comprise a host bridge/hub system that may couple processor 102A, 102B, ..., 102N, and host memory 104 to each other and to local bus 106. Chipset 108 may communicate with memory 104 via memory bus 112 and with host processor 102 via system bus 110. In alternative embodiments, host processor 102 and host memory 104 may be coupled directly to bus 106, rather than via chipset 108.

Local bus 106 may be coupled to a circuit card slot 120 having a bus connector (not shown). Local bus 106 may comprise a bus that complies with the Peripheral Component Interconnect (PCI) Local Bus Specification, Revision 3.0, Feb. 3, 2004 available from the PCI Special Interest Group, Portland, Oreg., U.S.A. (hereinafter referred to as a "PCI bus"). Alternatively, for example, bus 106 may comprise a bus that complies with the PCI Express™ Base Specification, Revision 1.1, Mar. 28, 2005 also available from the PCI Special Interest Group (hereinafter referred to as a "PCI Express bus"). Bus 106 may comprise other types and configurations of bus systems.

System 100 may additionally comprise one or more network controllers 126 (only one shown). A "network controller" as referred to herein relates to a device which may be coupled to a communication medium to transmit data to and/or receive data from other devices coupled to the communication medium, i.e., to send and receive network traffic. For example, a network controller may transmit packets 140 to and/or receive packets 140 from devices coupled to a network such as a local area network. As used herein, a "packet" means a sequence of one or more symbols and/or values that may be encoded by one or more signals transmitted from at least one sender to at least one receiver. Such a network controller 126 may communicate with other devices according to any one of several data communication formats such as, for example, communication formats according to versions of IEEE (Institute of Electrical and Electronics Engineers) Std. 802.3 (CSMA/CD Access Method, 2002 Edition); IEEE Std. 802.11 (LAN/MAN Wireless LANS, 1999 Edition), IEEE Std. 802.16 (2003 and 2004 Editions, LAN/MAN Broadband Wireless LANS), Universal Serial Bus, Firewire, asynchronous transfer mode (ATM), synchronous optical network (SONET) or synchronous digital hierarchy (SDH) standards.

In an embodiment, network controller 126 may be comprised on system motherboard 118. Rather than reside on motherboard 118, network controller 126 may be integrated onto chipset 108. Still alternatively, network controller 126 may be comprised in a circuit card 128 (e.g., NIC or network interface card) that may be inserted into circuit card slot 120. Circuit card slot 120 may comprise, for example, a PCI expansion slot that comprises a PCI bus connector (not shown). PCI bus connector (not shown) may be electrically and mechanically mated with a PCI bus connector (not shown) that is comprised in circuit card 128. Circuit card slot 120 and circuit card 128 may be constructed to permit circuit card 128 to be inserted into circuit card slot 120. When circuit card 128 is inserted into circuit card slot 120, PCI bus connectors (not shown) may become electrically and mechanically coupled to each other. When PCI bus connectors (not shown) are so coupled to each other, logic 130 in circuit card 128 may become electrically coupled to system bus 110.

System may comprise logic 130. Logic 130 may comprise hardware, software, or a combination of hardware and software (e.g., firmware). For example, logic 130 may comprise circuitry (i.e., one or more circuits), to perform operations described herein. For example, logic 130 may comprise one or more digital circuits, one or more analog circuits, one or more state machines, programmable logic, and/or one or more ASIC's (Application-Specific Integrated Circuits). Logic 130 may be hardwired to perform the one or more operations. Alternatively or additionally, logic 130 may be embodied in machine-executable instructions 132 stored in a memory, such as memory 104, to perform these operations. Alternatively or additionally, logic 130 may be embodied in firmware. Logic may be comprised in various components of system 100, including network controller 126, chipset 108, processor 102, and/or on motherboard 118. Logic 130 may be used to perform various functions by various components as described herein.

System 100 may comprise more than one, and other types of memories, buses, processors, and network controllers. For example, system 100 may comprise a plurality of processors, where each processor may be a coprocessor. Processor 102, memory 104, and busses 106, 110, 112 may be comprised in a single circuit board, such as, for example, a system motherboard 118, but embodiments of the invention are not limited in this respect.

Figure 2:
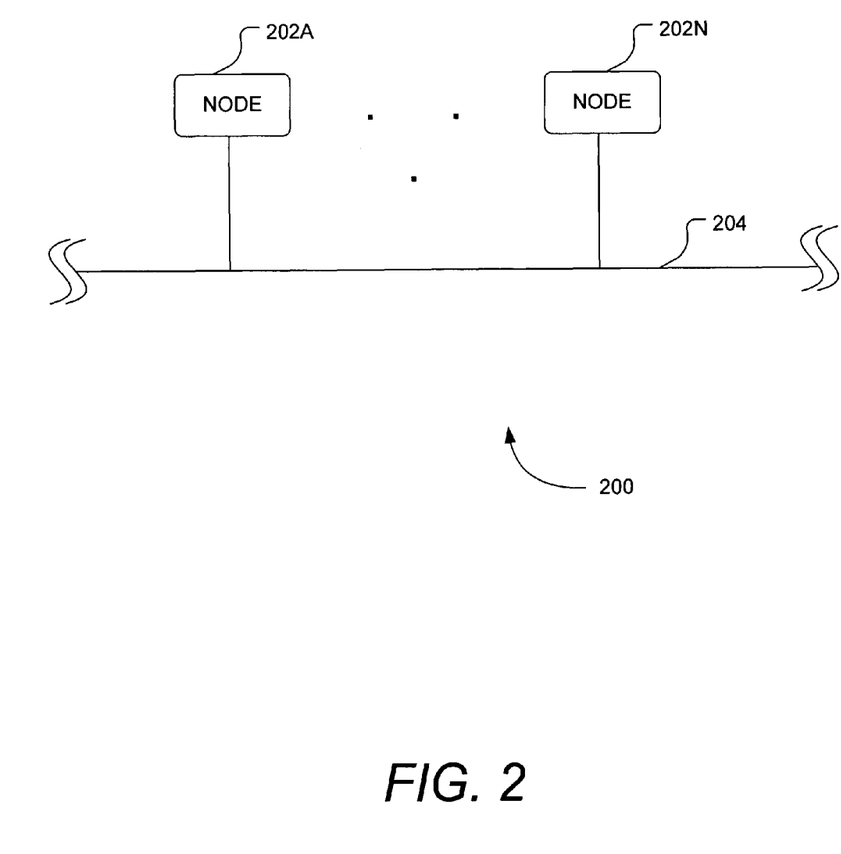
FIG. 2 illustrates a network according to an embodiment.

FIG. 2 illustrates a network 200 in which embodiments of the invention may operate. Network 200 may comprise a plurality of nodes 202A, . . . 202N, where each of nodes 202A, . . . , 202N may be communicatively coupled together via a communication medium 204. Nodes 202A . . . 202N may transmit and receive sets of one or more signals via medium 204 that may encode one or more packets. Communication medium 104 may comprise, for example, one or more optical and/or electrical cables, although many alternatives are possible. For example, communication medium 104 may comprise air and/or vacuum, through which nodes 202A . . . 202N may wirelessly transmit and/or receive sets of one or more signals.

In network 200, one or more of the nodes 202A . . . 202N may comprise one or more intermediate stations, such as, for example, one or more hubs, switches, and/or routers; additionally or alternatively, one or more of the nodes 202A . . . 202N may comprise one or more end stations. Also additionally or alternatively, network 200 may comprise one or more not shown intermediate stations, and medium 204 may communicatively couple together at least some of the nodes 202A . . . 202N and one or more of these intermediate stations. Of course, many alternatives are possible.

Figure 3:
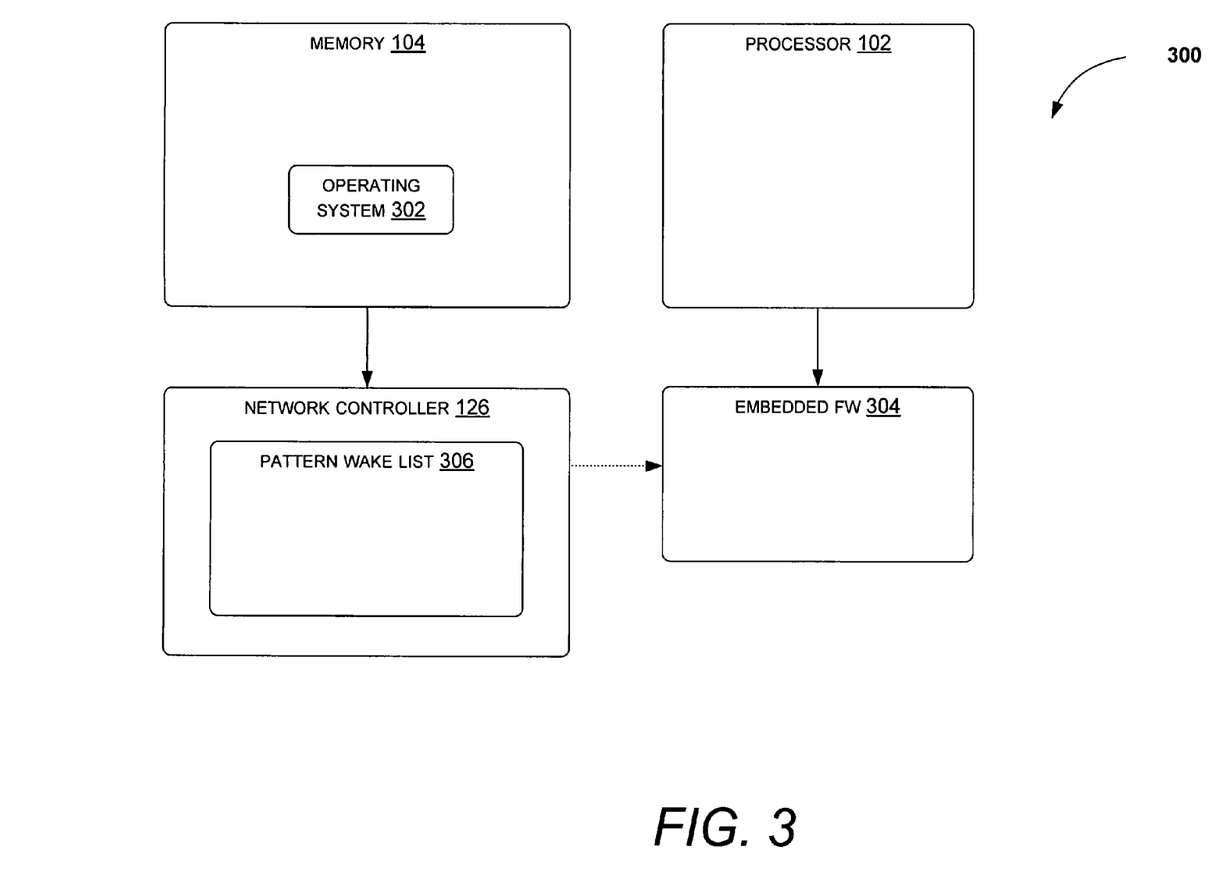
FIG. 3 illustrates a detailed system according to an embodiment.

FIG. 3 illustrates a system 300 according to at least one embodiment of the invention. As illustrated in FIG. 3, system may additionally comprise operating system 302, embedded firmware ("embedded FW") 304, and wake list 306. Memory 104 may host operating system 302. Operating system 302 may manage system resources and control tasks that are run on system 100. Operating system 302 may comprise any one of a number of operating systems including but not limited to, for example, Microsoft® Windows®. Embedded firmware 304 may be used to enable a management console, for example, to perform manageability functions on a client system, for example, remotely. Manageability functions may comprise, for example, software updates/upgrades, running system diagnostics, and asset management. In an embodiment, embedded firmware 304 may enable out-of-band manageability of system 100. Out-of-band manageability refers to the ability to manage a system regardless of the state of the operating system or system power. Wake-list 306 may comprise a plurality of dynamically modifiable passwords to which network controller 126 may wake system 100 in an embodiment.

Figure 4:
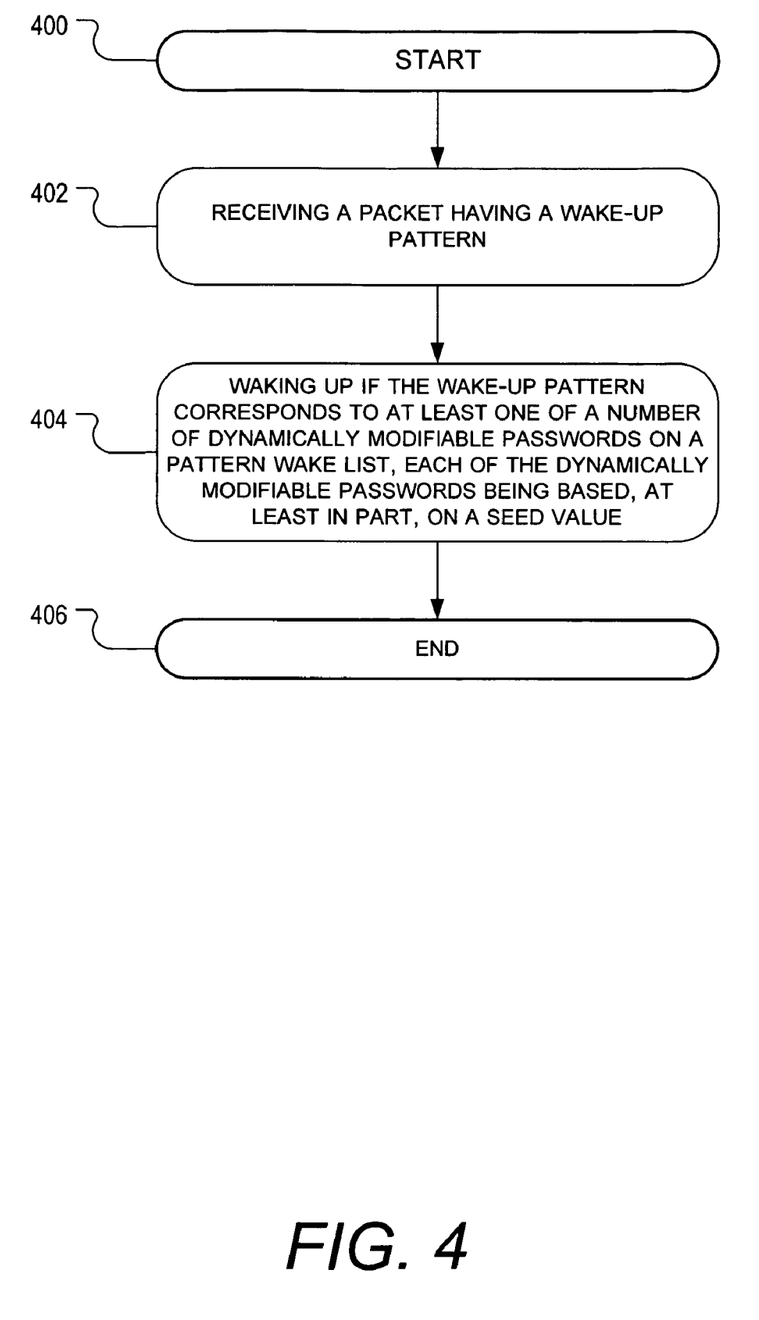
FIG. 4 is a flowchart illustrating a method according to an embodiment.

FIG. 4 illustrates a method according to one embodiment of the invention. The method of FIG. 4 begins at block 400 and continues to block 402 where the method may comprise receiving a packet having a wake-up pattern. A wake-up pattern may be identified by pre-defined content that flags the packet as a wake-up packet. In an embodiment, the wake-up packet may be sent by a management console for the purpose of waking up a client system, e.g., system 100, to enable manageability functions to be performed remotely. In an embodiment, system 100 may comprise a wake-enabled system in which the motherboard 118 and network controller 126 are configured to enable WOL functionality (e.g., correct BIOS (Basic Input/Output System) settings, an active network controller dependent of system power).

Furthermore, system 100 may transition from sleep mode to wake mode in accordance with the ACPI (Advanced Configuration and Power Interface) Specification, Rev. 3.0, dated Sep. 2, 2004. Under the ACPI Specification, a system can transition between power states S5, S4, S3, S2, S1, and S0. S0 refers to the running state where the system 100 is fully powered. States S1-S5 refer to low power states (e.g., suspend state, hibernate, shutdown).

At block 404, the method may comprise waking up if the wake-up pattern corresponds to one of a number (e.g., 1 or more) of dynamically modifiable passwords on a pattern wake list, each of the dynamically modifiable passwords being based, at least in part, on a seed value. In an embodiment, upon receiving a packet having a wake-up pattern, network controller 126 may determine if the wake-up pattern corresponds to one of the dynamically modifiable passwords in its pattern wake list 306. If the wake-up pattern corresponds to one of the dynamically modifiable passwords in its pattern wake list 306, then network controller 126 may wake system 100. If wake-up pattern does not correspond to one of the dynamically modifiable passwords in its pattern wake list 306, then in an embodiment, the wake-up pattern is assumed to be sent from an untrusted source, and system 100 is not awakened.

In an embodiment, embedded firmware 304 may program network controller 126 with the pattern wake list. Alternatively, network controller 126 may be programmed by operating system 302. Furthermore, in an embodiment, network controller 126 may wake up system 100 by waking up embedded firmware 304.

A seed value refers to a secret value. In an embodiment, a seed value may be generated by, for example, a management console. During initiation with a client system, such as system 100, the management console may share the seed value with the client system. Additionally, the management console and the client system may share a function for generating dynamically modifiable passwords based, at least in part, on the seed value. A dynamically modifiable password refers to a password that may be dynamically modified. Since both management console and client system know the seed value and function, both may dynamically modify passwords using the seed value. In an embodiment, modification of passwords may prevent third parties (e.g., malicious attackers, eaves droppers) from reusing and/or from guessing passwords.

In an embodiment, the pattern wake list 306 may comprise a single dynamically modifiable password that is valid for a specified period of time, T. In this embodiment, network controller 126 may be programmed to wake up system 100 if a wake-up pattern corresponds to the single dynamically modifiable password, and the wake-up pattern is received within time period T. Further in this embodiment, network controller 126 may be reprogrammed every T period to change the dynamically modifiable password. Furthermore, T may be defined to allow an acceptable number of replay wake-ups. In this respect, it may be determined that a replay (e.g., management console may resend a packet) is acceptable if it is received within X minutes of the first transmission of the packet having the same wake-up pattern, but that after that predetermined period, it will be assumed that a third party (e.g., malicious attacker) is trying to send the packet, and the system 100 will not be awakened. In this embodiment, the dynamically modifiable password may comprise, for example, a one-way hash function of the seed value and a current time value.

In another embodiment, the pattern wake list may comprise one or more dynamically modifiable passwords based, at least in part, on a sequence of patterns. In this embodiment, the function may be determined such that the function generates a sequence of patterns. That is, pattern $L_N$ will be followed by pattern $L_{N+1}$, and pattern $L_{N+1}$ will be followed by pattern $L_{N+2}$, etc. In this embodiment, both management console and client system, for example, may generate one or more dynamically modifiable passwords, $L_N$, $L_{N+1}$, $L_{N+2}$, ..., $L_{N+j}$, based, at least in part, on the seed value and known function, where the dynamically modifiable passwords $L_N$, $L_{N+1}$, $L_{N+2}$, ..., $L_{N+j}$ follow a sequence of patterns.

Embedded firmware 304 may generate pattern wake list 306, where pattern wake list 306 comprises a single dynamically modifiable password in the sequence of patterns, where the single wake-up pattern may comprise the subsequent expected pattern in the sequence. In other words, if network controller 126 previously received wake-up pattern $L_N$, then the subsequent expected wake-up pattern comprises $L_{N+1}$. In this embodiment, network controller 126 may wake up system 100 (or embedded firmware 304) upon receiving wake-up pattern comprising $L_{N+1}$.

Embedded firmware 304 may, alternatively, generate pattern wake list 306, where pattern wake list 306 comprises a plurality of dynamically modifiable passwords in the sequence, where the plurality of dynamically modifiable passwords may comprise a plurality of subsequent expected patterns in the sequence. In other words, if network controller 126 previously received wake-up pattern $L_N$, then a plurality of subsequent expected wake-up pattern comprises $L_{N+1}$, ..., $L_{N+X}$, where X may be the maximum number of wake-up patterns supported by network controller 126. In this embodiment, network controller 126 may wake up system 100 (or embedded firmware 304) upon receiving wake-up pattern comprising $L_{N+1}$, ..., $L_{N+X}$. In this manner, replays of the same wake-up pattern are not acceptable. However, since there are several dynamically modifiable passwords on a pattern wake list 306, a management console may resend a packet with a different wake-up pattern (e.g., subsequent pattern in the sequence) and still be able to wake up the client system. This may be done up to X times. In this embodiment, upon receipt of a wake-up pattern, pattern wake list 306 may be modified by recalculating the dynamically modifiable passwords. Recalculating the dynamically modifiable passwords may comprise determining a subset of the sequence of dynamically modifiable passwords. For example, this may comprise determining the next X patterns in the sequence. In other words, if X=5, and $L_9$ is received, then pattern wake list 306 may be modified to comprise the next 5 patterns in the sequence, or $L_{10}$, $L_{11}$, $L_{12}$, $L_{13}$, $L_{14}$.

Further to this embodiment, the dynamically modifiable passwords may be valid for a pre-determined period of time, T. Here, pattern wake list 306 may be modified by recalculating dynamically modifiable passwords every time period, T. For example, every T period, embedded firmware 304 may wake up and compute new dynamically modifiable passwords based on the updated time value, reprogram network controller 126 with the new pattern wake list 306, and then return to sleep state.

The following is an example of an algorithm to generate a pattern wake list 306 (Pattern_Wake_List) having a plurality of dynamically modifiable passwords in the sequence, where the passwords are valid for a predetermined period of time:

1. Initiate ID=0; on subsequent iterations, set ID=Index (last received pattern).
2. Set SIZE=to number of wake-up patterns supported by network controller 126, for example.
3. Set TimeCounter, where TimeCounter may be based on a granularity value (e.g., 1 day, or 10 minutes), and its value will ensure a different dynamically modifiable password sequence for each time period. For example, if the level of granularity is 1 day, then TimeCounter may be sent to equal the number of days since 1970 (or some arbitrary year, for example).
4. For Index=(ID+1) to (ID+SIZE):
Pattern_Wake_List[Index]=CalculatePattern[Index, Seed, TimeCounter];

The method may end at block 406.

Figure 5:
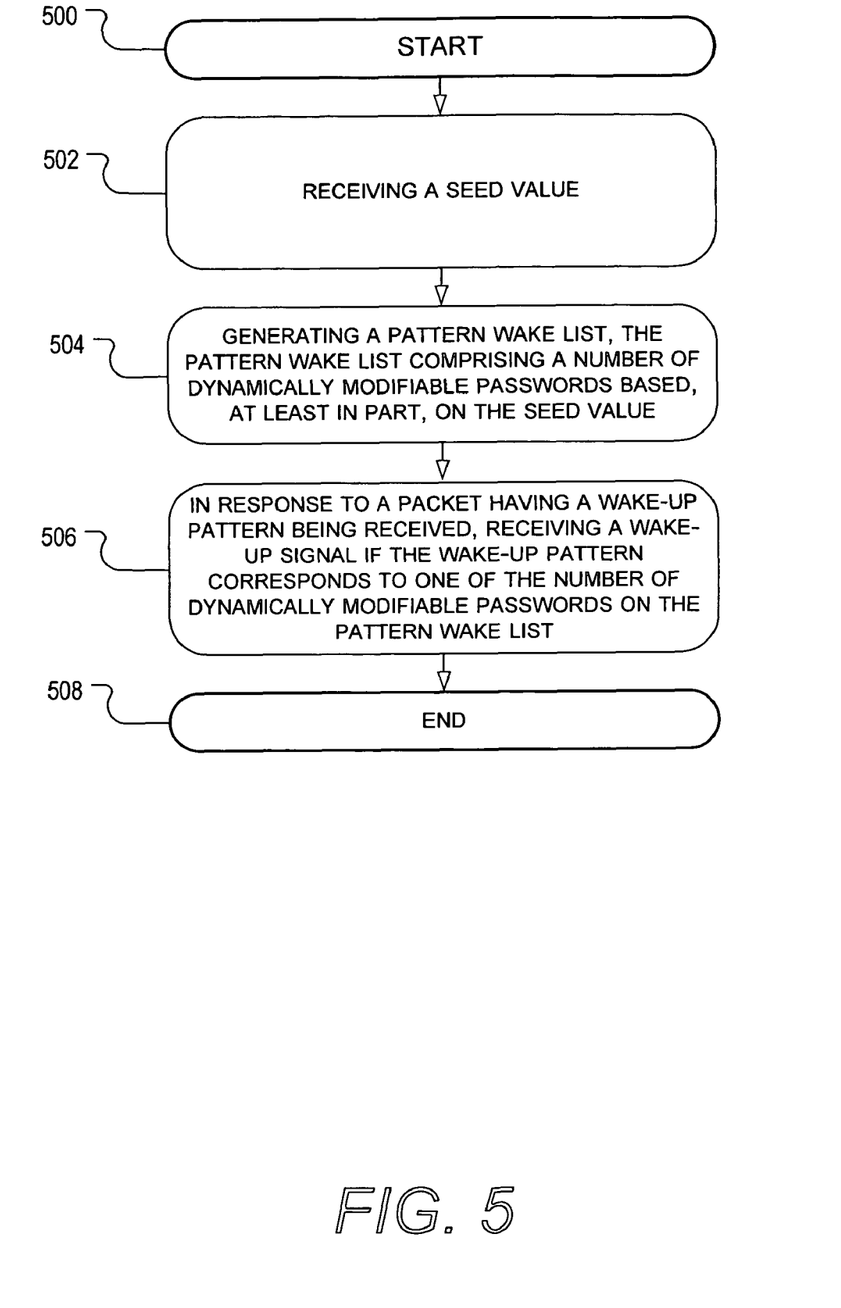
FIG. 5 is a flowchart illustrating another method according to an embodiment.

FIG. 5 illustrates another method according to an embodiment of the invention. The method of FIG. 5 begins at block 500 and continues to block 502 where the method may comprise receiving a seed value. In an embodiment, the seed value may be generated by a management console, and then shared with a client system. Embedded firmware 304 on client system, such as system 100, may receive the seed value.

At block 504, the method may comprise generating a pattern wake list, the pattern wake list comprising a number of dynamically modifiable passwords based, at least in part, on the seed value. Management console and client system (e.g., embedded firmware 304) may use seed value to generate a number of dynamically modifiable passwords for pattern wake list 306.

At block 506, the method may comprise in response to a packet having a wake-up pattern being received, receiving a wake-up signal if the wake-up pattern corresponds to one of the number of dynamically modifiable passwords on the pattern wake list. If the packet comprises a wake-up pattern, network controller 126 may determine if the wake-up pattern corresponds to one of the dynamically modifiable passwords. This may be done in any of the manners described above. If the wake-up pattern corresponds to one of the dynamically modifiable passwords, embedded firmware 304 (or generally, system 100) may receive wake-up signal from network controller 126. In an embodiment, once system 100 is awake, manageability functions may be performed. In an embodiment, waking up system 100 may comprise waking up embedded firmware 304, where embedded firmware 304 may perform out-of-band manageability as described above.

The method ends at block 508.

CONCLUSION

Therefore, in an embodiment, a method may comprise receiving a packet having a wake-up pattern, and waking up if the wake-up pattern corresponds to one of a number of dynamically modifiable passwords on a pattern wake list, each of the dynamically modifiable passwords being based, at least in part, on a seed value.

Embodiments of the invention may secure a client system from wake events by restricting wake events to those that come from a trusted source, such as a management console. By using a dynamically modifiable password based on a seed provided by a trusted source, only the trusted source and the target system (e.g., client system) can generate the dynamically modifiable passwords that will wake up the target system and allow the trusted source to communicate with the target system.

In the foregoing specification, the invention has been described with reference to specific embodiments thereof. It will, however, be evident that various modifications and changes may be made to these embodiments without departing therefrom. The specification and drawings are, accordingly, to be regarded in an illustrative rather than a restrictive sense.

What is claimed is:

1. A method comprising:
   in a network controller of a client system, receiving a packet having a wake-up pattern; and
   waking up at least part of the client system if the wake-up pattern corresponds to one of a number of dynamically modifiable passwords on a pattern wake list, each of the dynamically modifiable passwords being based, at least in part, on a secret seed value generated by a management console.

2. The method of claim 1, wherein the pattern wake list comprises a single dynamically modifiable password that is valid for a specified period of time, T.

3. The method of claim 2, wherein the pattern wake list is modified every T period of time.

4. The method of claim 1, wherein the pattern wake list comprises one or more dynamically modifiable passwords based, at least in part, on a sequence of patterns.

5. The method of claim 4, additionally comprising modifying the pattern wake list by recalculating the dynamically modifiable passwords.

6. The method of claim 5, wherein said recalculating the dynamically modifiable passwords comprises determining a subset of the sequence of patterns upon receiving the packet having a wake-up pattern.

7. The method of claim 6, wherein the dynamically modifiable passwords are recalculated every T period of time.

8. The method of claim 1, wherein said waking up comprises waking up an embedded firmware device on a system.

9. A method comprising:
   in part of a client system, receiving a secret seed value generated by a management console;
   generating a pattern wake list, the pattern wake list comprising a number of dynamically modifiable passwords based, at least in part, on the seed value;
   in response to a packet having a wake-up pattern being received, receiving a wake-up signal if the wake-up pattern corresponds to one of the number of dynamically modifiable passwords on the pattern wake list.

10. The method of claim 9, wherein the pattern wake list comprises a single dynamically modifiable password that is valid for a specified period of time, T.

11. The method of claim 10, wherein the pattern wake list is modified every T period of time.

12. The method of claim 9, wherein the pattern wake list comprises one or more dynamically modifiable passwords based, at least in part, on a sequence of patterns.

13. The method of claim 12, additionally comprising modifying the pattern wake list by recalculating the dynamically modifiable passwords.

14. The method of claim 13, wherein said recalculating the dynamically modifiable passwords comprises determining a subset of the sequence of patterns upon receiving the packet having a wake-up pattern.

15. The method of claim 14, wherein the dynamically modifiable passwords are recalculated every T period of time.

16. An apparatus comprising:
   logic in a client system to:
      receive a secret seed value generated by a management console;
      generate a pattern wake list, the pattern wake list comprising a number of dynamically modifiable passwords based, at least in part, on the seed value;
      in response to a packet having a wake-up pattern being received, receive a wake-up signal if the wake-up pattern corresponds to one of the number of dynamically modifiable passwords on the pattern wake list, wherein the management console and the client system share a function for generating the dynamically modifiable passwords based on the seed value.

17. The apparatus of claim 16, wherein the pattern wake list comprises a single dynamically modifiable password that is valid for a specified period of time, T.

18. The apparatus of claim 17, wherein the logic includes logic to modify the pattern wake list every T period of time.

19. The apparatus of claim 16, wherein the pattern wake list comprises one or more dynamically modifiable passwords based, at least in part, on a sequence of patterns.

20. The apparatus of claim 19, the logic to additionally comprise modifying the pattern wake list by recalculating the dynamically modifiable passwords.

21. The apparatus of claim 20, wherein said recalculating the dynamically modifiable passwords comprises determining a subset of the sequence of patterns upon receiving the packet having a wake-up pattern.

22. The apparatus of claim 21, wherein the logic includes logic to recalculate the dynamically modifiable passwords every T period of time.

23. A system comprising:
   a memory having an operating system, the operating system to configure a plurality of dynamically modifiable passwords; and
   a network controller communicatively coupled to the memory, the network controller to:
   receive a packet having a wake-up pattern; and
   wake up the system if the wake-up pattern corresponds to one of a number of dynamically modifiable passwords on a pattern wake list, each of the dynamically modifiable passwords being based, at least in part, on a secret seed value generated by a management console.

24. The system of claim 23, wherein the pattern wake list comprises a single dynamically modifiable password that is valid for a specified period of time, T.

25. The system of claim 24, the pattern wake list is modified every T period of time.

26. The system of claim 23, wherein the pattern wake list comprises one or more dynamically modifiable passwords based, at least in part, on a sequence of patterns.

* * * * *

UNITED STATES PATENT AND TRADEMARK OFFICE
CERTIFICATE OF CORRECTION

PATENT NO. : 7,779,451 B2  Page 1 of 1
APPLICATION NO. : 11/395471
DATED : August 17, 2010
INVENTOR(S) : Avigdor Eldar

It is certified that error appears in the above-identified patent and that said Letters Patent is hereby corrected as shown below:

On the Title page, in field (56), under "Other Publications", in column 2, line 10, delete "interenet" and insert -- internet --, therefor.

On the Title page, in field (56), under "Other Publications", in column 2, line 14, delete "interenet" and insert -- internet --, therefor.

Signed and Sealed this

Ninth Day of November, 2010

David J. Kappos
*Director of the United States Patent and Trademark Office*